US012752838B2

(12) United States Patent
Gatten

(10) Patent No.: US 12,752,838 B2
(45) Date of Patent: Oct. 6, 2026

(54) STEERING ANGLE ERROR MONITORING

(71) Applicant: Caterpillar Inc., Peoria, IL (US)

(72) Inventor: Benjamin Meier Gatten, Pleasanton, CA (US)

(73) Assignee: Caterpillar Inc., Peoria, IL (US)

( * ) Notice: Subject to any disclaimer, the term of this patent is extended or adjusted under 35 U.S.C. 154(b) by 49 days.

(21) Appl. No.: 18/516,855

(22) Filed: Nov. 21, 2023

(65) Prior Publication Data

US 2024/0182107 A1 Jun. 6, 2024

Related U.S. Application Data

(60) Provisional application No. 63/524,849, filed on Jul. 3, 2023, provisional application No. 63/429,164, filed on Dec. 1, 2022.

(51) Int. Cl.

| | |
|---|---|
| ***B62D 5/04*** | (2006.01) |
| ***B62D 15/02*** | (2006.01) |
| ***G01C 22/00*** | (2006.01) |

(52) U.S. Cl.

CPC ........... *B62D 5/049* (2013.01); *B62D 15/024* (2013.01); *G01C 22/00* (2013.01)

(58) Field of Classification Search

CPC ...... B62D 5/049; B62D 15/024; B62D 6/002; G01C 22/00

See application file for complete search history.

(56) References Cited

U.S. PATENT DOCUMENTS

| | | | |
|---|---|---|---|
| 4,844,685 | A | 7/1989 | Sagaser |
| 5,297,916 | A | 3/1994 | Fujikawa et al. |
| 6,052,647 | A | 4/2000 | Parkinson et al. |
| 7,229,139 | B2 | 6/2007 | Lu et al. |
| 8,265,826 | B2 | 9/2012 | Feller et al. |
| 8,275,516 | B2 | 9/2012 | Murphy |
| 8,306,697 | B2 | 11/2012 | Lu et al. |
| 8,340,872 | B2 | 12/2012 | Mintah et al. |
| 8,639,416 | B2 | 1/2014 | Jones et al. |

(Continued)

FOREIGN PATENT DOCUMENTS

| | | | |
|---|---|---|---|
| AU | 2016259362 | B1 | 6/2017 |
| CN | 105987696 | A | 10/2016 |

(Continued)

OTHER PUBLICATIONS

International Search Report and Written Opinion for PCT/US2023/080816; mail date Feb. 12, 2024; 12 pages.

(Continued)

*Primary Examiner* — Grant Moubry
*Assistant Examiner* — Ruben Picon-Feliciano

(57) ABSTRACT

A steering angle error monitoring system may include a steering ground truth system, an odometry system and a steering controller. The odometry system may include a steering angle sensor and a speed sensor. The steering controller is configured to: determine a steering angle error based on a difference between an estimated turning rate based on signals from the odometry system over a period of time and an actual turning rate based on signals from the steering ground truth system over the period of time and output control signals to output a notification or adjust a steering routine based on the steering angle error.

20 Claims, 5 Drawing Sheets

(56) References Cited

U.S. PATENT DOCUMENTS

| | | | |
|---|---|---|---|
| 9,002,565 | B2 | 4/2015 | Jones et al. |
| 9,141,111 | B2 | 9/2015 | Webber et al. |
| 9,389,615 | B2 | 7/2016 | Webber et al. |
| 10,168,714 | B2 | 1/2019 | Webber et al. |
| 10,241,215 | B2 | 3/2019 | Medagoda et al. |
| 10,816,063 | B2 | 10/2020 | Spitz |
| 2001/0019356 | A1 | 9/2001 | Takeda et al. |
| 2001/0044685 | A1 | 11/2001 | Schubert |
| 2005/0165546 | A1 | 7/2005 | Aral |
| 2009/0112423 | A1 | 4/2009 | Foster et al. |
| 2010/0206100 | A1 | 8/2010 | Vyas et al. |
| 2011/0054729 | A1 | 3/2011 | Whitehead et al. |
| 2011/0224858 | A1 | 9/2011 | Bissontz |
| 2012/0315120 | A1 | 12/2012 | Hyder |
| 2014/0055077 | A1 | 2/2014 | Barrass et al. |
| 2015/0176253 | A1 | 6/2015 | Taylor et al. |
| 2015/0275469 | A1 | 10/2015 | Fredrickson et al. |
| 2016/0273196 | A1 | 9/2016 | Funk et al. |
| 2017/0146667 | A1 | 5/2017 | Medagoda et al. |
| 2018/0206392 | A1 | 7/2018 | Matsuzaki |
| 2018/0238710 | A1 | 8/2018 | Gregory |
| 2018/0290592 | A1 | 10/2018 | Stein et al. |
| 2018/0297204 | A1 | 10/2018 | Krasny et al. |
| 2018/0373264 | A1* | 12/2018 | Madsen ............... G05D 1/0088 |
| 2019/0084156 | A1 | 3/2019 | Yasuda et al. |
| 2019/0119087 | A1 | 4/2019 | Fischbach et al. |
| 2019/0276281 | A1 | 9/2019 | Hofmeister et al. |
| 2020/0029490 | A1 | 1/2020 | Bertucci et al. |
| 2020/0071144 | A1 | 3/2020 | Draayer et al. |
| 2020/0131741 | A1 | 4/2020 | Lehmann et al. |
| 2020/0300691 | A1 | 9/2020 | Bonthuis et al. |
| 2020/0340213 | A1 | 10/2020 | Zimmerman et al. |
| 2020/0369498 | A1 | 11/2020 | Ekshinge et al. |
| 2021/0000013 | A1 | 1/2021 | Robertson et al. |
| 2021/0116914 | A1 | 4/2021 | Ren et al. |
| 2021/0131072 | A1 | 5/2021 | Gratton et al. |
| 2021/0170947 | A1* | 6/2021 | Yunus ....................... B60R 1/26 |
| 2021/0215483 | A1 | 7/2021 | Krone et al. |
| 2021/0222743 | A1 | 7/2021 | Whitney et al. |
| 2021/0264624 | A1 | 8/2021 | Fu et al. |
| 2021/0301494 | A1 | 9/2021 | Berry et al. |
| 2021/0316617 | A1 | 10/2021 | Pugh |
| 2022/0106764 | A1 | 4/2022 | Iwasaki et al. |
| 2022/0120060 | A1 | 4/2022 | Ready-Campbell et al. |
| 2022/0126816 | A1 | 4/2022 | Von Holst et al. |
| 2022/0130063 | A1 | 4/2022 | Thomas et al. |
| 2022/0162048 | A1 | 5/2022 | Meijer et al. |
| 2022/0178726 | A1 | 6/2022 | Robinson et al. |
| 2022/0283298 | A1 | 9/2022 | Di et al. |
| 2022/0333344 | A1 | 10/2022 | Kean et al. |
| 2022/0350991 | A1 | 11/2022 | Vesperman et al. |
| 2022/0363280 | A1 | 11/2022 | Calderon |
| 2022/0382274 | A1 | 12/2022 | Kean et al. |
| 2022/0412050 | A1 | 12/2022 | Hoaby et al. |

FOREIGN PATENT DOCUMENTS

| | | | |
|---|---|---|---|
| CN | 108289408 | A | 7/2018 |
| CN | 108438048 | A | 8/2018 |
| EP | 3171134 | B1 | 5/2017 |
| KR | 20170037404 | A | 4/2017 |
| KR | 20180098525 | A | 9/2018 |
| WO | 2021073165 | A1 | 4/2021 |
| WO | 2022196242 | A1 | 9/2022 |

OTHER PUBLICATIONS

Ahamed et al. “Advancements of wave energy converters based on power take off (PTO) systems: A review.” Ocean Engineering 204 (2020): 107248. Retrieved on Jan. 8, 2024 (Jan. 8, 2024) from entire document, 47 pages.

Bostelman et al. “Methods for improving visibility measurement standards of powered industrial vehicles.” Safety science 62 (2014): 257-270. Retrieved on Jan. 15, 2024 (Jan. 15, 2024) from entire document, 14 pages.

International Search Report and Written Opinion for PCT/US2023/037158; mail date Jan. 23, 2024; 9 pages.

International Search Report and Written Opinion for PCT/US2023/037216; mail date Jan. 23, 2024; 15 pages.

International Search Report and Written Opinion for PCT/US2023/081457; mail date Mar. 13, 2024; 7 pages.

International Search Report and Written Opinion for PCT/US2024/015857; mail date Jun. 21, 2024; 12 pages.

International Search Report and Written Opinion for PCT/US2024/015859; mail date Jun. 4, 2024; 8 pages.

International Search Report and Written Opinion for PCT/US2024/015860; mail date Jun. 4, 2024; 7 pages.

International Search Report and Written Opinion for PCT/US2024/015878; mail date May 20, 2024; 7 pages.

International Search Report and Written Opinion for PCT/US2024/020789; mail date Jul. 16, 2024; 6 pages.

* cited by examiner

STEERING ANGLE ERROR MONITORING

CROSS-REFERENCE TO RELATED APPLICATIONS

The present non-provisional application claims priority from co-pending U.S. provisional patent Application Ser. No. 63/429,164 filed on Dec. 1, 2022, by Benjamin Meier Gatten and entitled ONLINE ESTIMATION AND CALIBRATION OF STEERING BIAS, and co-pending U.S. provisional patent Application Ser. No. 63/524,849 filed on Jul. 3, 2023, by Benjamin Meier Gatten and entitled VEHICLE CONTROL, the full disclosures of which are hereby incorporated by reference.

BACKGROUND

Vehicles are steered by the vehicle's steering system. The steering system may comprise mechanical, electrical and hydraulic components that react to a steering command to turn the wheels or tracks of the vehicle. Some vehicles include a steering wheel or other mechanical input device by which an operator may provide a steering command. Autonomous vehicles may have a controller that outputs control signals according to a steering and navigation routine or program, wherein the control signals serve as a steering command for the steering system.

Figure 1:
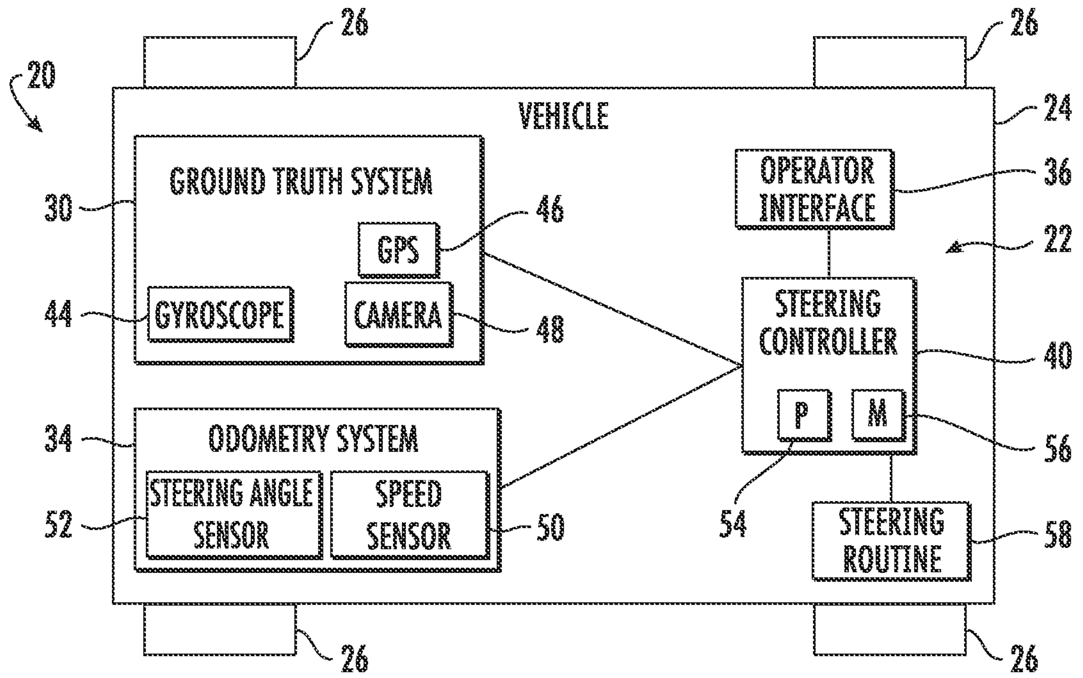
FIG. 1 is a diagram schematically illustrating portions of an example steering angle error monitoring system.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION OF EXAMPLES

Due to alignment variations, newly manufactured vehicles often include a slight steering bias or steering offset which may cause the vehicle's steering response to not perfectly match an input steering command. Over time, changes in alignment may result in the steering bias or offset drifting even further. Humans naturally compensate for changes in the vehicle steering bias. However, such drifting of the steering bias may have adverse effects for autonomous vehicles.

Disclosed are example steering angle error monitoring systems, vehicles and methods that provide dynamic, online and continuous or periodic monitoring, updating and recalibration of steering by the vehicle. In contrast to a one-time steering calibration that may be performed during manufacture of the vehicle or during the engineering or design of the vehicle, the example steering angle error monitoring systems, vehicles and methods may monitor, update and calibrate the steering in the field or during use. The example steering angle error monitoring systems, vehicles and methods may continually monitor, update and recalibrate the steering during travel of the vehicle based upon a detected difference between the estimated turning rate of the vehicle (also referred to as yaw rate) from a wheel odometry system and the actual or measured turning rate/yaw rate from a ground truth system. This detected difference, referred to as a steering angle error (or steering angle rate error), is then used by a steering controller to automatically periodically adjust a steering routine used for automated steering control of the vehicle.

In some implementations, the automatic periodic adjustment of the steering routine used to carry out automated steering control of the vehicle may be paused or temporarily stopped based upon sensed conditions. The automatic periodic adjustment may be temporarily paused in response to the slip/slip difference of the vehicle exceeding a predetermined slip threshold. Wheel slip or slip difference (as a percentage) may be defined as abs ((nominal velocity/wheel speed)−1)*100%, where the nominal velocity is a vehicle true forward speed, such as measured by a global positioning satellite system.

The automatic periodic adjustment may be temporally paused in response to the actual turning rate of the vehicle (yaw rate) exceeding a predetermined turning rate threshold. The automatic periodic adjustment may be temporarily paused in response to the actual speed of the vehicle being sufficiently slow so as experienced reduced accuracy. For example, the automatic periodic adjustment may be paused in response to the actual speed of the vehicle being less than or equal to 1 m/s or, in some cases, less than or equal to 5 m/s. The automatic periodic adjustment may be temporally paused in response to or based upon a difference between the current determined steering angle error and a prior determined steering angle error exceeding a predetermined Delta threshold.

The automatic periodic adjustment may be temporally paused in response to side slipping exceeding a pre-determined threshold. For example, GPS or visual odometry (from a camera) may be used to determine how much velocities in the forward direction and how much is to the side. If such sideways motion or lateral motion exceeds a predefined or predetermined threshold, the automatic periodic adjustment is paused.

In some implementations, the example steering angle error monitoring systems, vehicles and methods may additionally output a notification based upon the determined steering angle error. In some implementations, rather than adjusting the steering routine, the steering controller may alternatively output a notification based upon the determined steering angle error. For example, in response to the determined steering angle error exceeding a predetermined steering angle error threshold, the steering controller may output control signals causing a display to present a visible notification, an audible alert or other notification communication to an operator or manager of the vehicle. Such a notification may indicate a hardware failure or concern for the vehicle. Such a notification may be transmitted in a wired or wireless fashion to a manager or operator of the vehicle. In some implementations, the steering controller may output the notification in response to the Delta (the difference between the current determined steering angle error and a prior determined steering angle error) exceeding a predefined Delta threshold.

In some implementations, the steering angle error is determined such that the steering angle error has a value which serves as an offset such that the estimated rotation rate of the vehicle from the wheel odometry system (based upon the steering angle, forward speed and wheelbase), plus the offset, closely approximates the actual or measured turning rate/yaw rate of the vehicle. In some implementations, steering angle error is a value determined over a period of time exceeding one minute, for example, five minutes, wherein the multiple data points or readings (estimated and actual turning rates (yaw rates) at particular points in time) during the period of time. In such implementations, steering angle error is a value such that the average of the multiple data points or readings for the estimated turning rate/yaw rate for the vehicle from the wheel odometry system, plus the offset, closely approximates the corresponding multiple data points readings for the actual turning rate/yaw rate from the ground truth system. Said another way, in such implementations, the plot of the estimated turning rate/yaw rate from the wheel odometry system, with the applied steering angle error offset, most closely matches or corresponds to the plot of the actual or measured turning rate/yaw rate from the ground truth system. In some implementations, the steering angle error is determined by the steering controller using a Gaussian optimization.

For purposes of this application, the term "processing unit" shall mean a presently developed or future developed computing hardware that executes sequences of instructions contained in a non-transitory memory. Execution of the sequences of instructions causes the processing unit to perform steps such as generating control signals. The instructions may be loaded in a random-access memory (RAM) for execution by the processing unit from a read only memory (ROM), a mass storage device, or some other persistent storage. In other embodiments, hard wired circuitry may be used in place of or in combination with software instructions to implement the functions described. For example, a controller may be embodied as part of one or more application-specific integrated circuits (ASICs). Unless otherwise specifically noted, the controller is not limited to any specific combination of hardware circuitry and software, nor to any particular source for the instructions executed by the processing unit.

For purposes of this disclosure, unless otherwise explicitly set forth, the recitation of a "processor", "processing unit" and "processing resource" in the specification, independent claims or dependent claims shall mean at least one processor or at least one processing unit. The at least one processor or processing unit may comprise multiple individual processors or processing units at a single location or distributed across multiple locations.

For purposes of this disclosure, the term "coupled" shall mean the joining of two members directly or indirectly to one another. Such joining may be stationary in nature or movable in nature. Such joining may be achieved with the two members, or the two members and any additional intermediate members being integrally formed as a single unitary body with one another or with the two members or the two members and any additional intermediate member being attached to one another. Such joining may be permanent in nature or alternatively may be removable or releasable in nature. The term "operably coupled" shall mean that two members are directly or indirectly joined such that motion may be transmitted from one member to the other member directly or via intermediate members. The term "fluidly coupled" shall mean that two or more fluid transmitting volumes are connected directly to one another or are connected to one another by intermediate volumes or spaces such that fluid may flow from one volume into the other volume.

For purposes of this disclosure, the phrase "configured to" denotes an actual state of configuration that fundamentally ties the stated function/use to the physical characteristics of the feature proceeding the phrase "configured to".

For purposes of this disclosure, unless explicitly recited to the contrary, the determination of something "based on" or "based upon" certain information or factors means that the determination is made as a result of or using at least such information or factors; it does not necessarily mean that the determination is made solely using such information or factors. For purposes of this disclosure, unless explicitly recited to the contrary, an action or response "based on" or "based upon" certain information or factors means that the action is in response to or as a result of such information or factors; it does not necessarily mean that the action results solely in response to such information or factors.

For purposes of this, unless explicitly recited to the contrary, recitations reciting that signals "indicate" a value or state means that such signals either directly indicate a value, measurement or state, or indirectly indicate a value, measurement or state. Signals that indirectly indicate a value, measure or state may serve as an input to an algorithm or calculation applied by a processing unit to output the value, measurement or state. In some circumstances, signals may indirectly indicate a value, measurement or state, wherein such signals, when serving as input along with other signals to an algorithm or calculation applied by the processing unit may result in the output or determination by the processing unit of the value, measurement or state.

Figure 2:
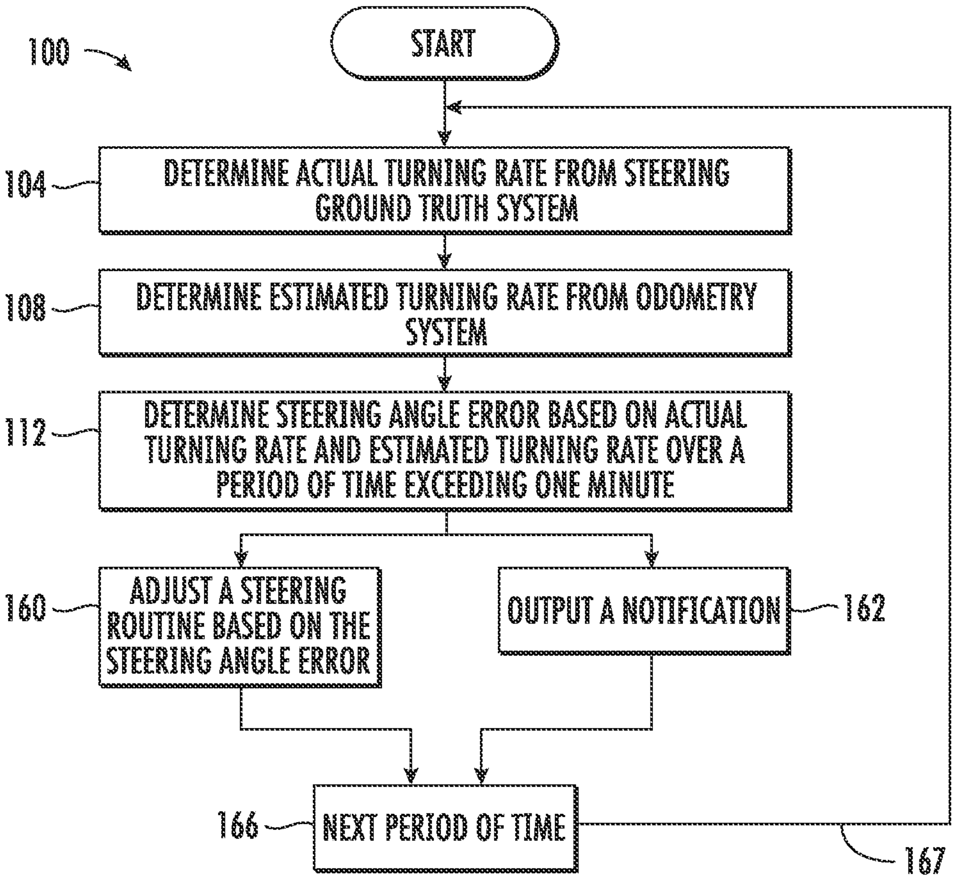
FIG. 2 is a flow diagram of an example vehicle steering angle error monitoring method.

FIG. 1 schematically illustrates an example vehicle 20 having an example steering angle error monitoring system 22 for carrying out an example steering angle error monitoring method 100 (shown in FIG. 2). Vehicle 20 may be in the form of an agricultural vehicle (a tractor, a harvester, self-propelled sprayer or the like), a passenger vehicle (car or truck) or others self-propelled vehicle that is automatically steered to move along a path.

Vehicle 20 comprises a frame 24 rotatably or movably supporting ground engaging or traction members 26 which may be in the form of wheels or tracks. At least two of such traction members 26 is rotatable or steerable to steer vehicle 20. Such traction members 26 are steered in response to signals from steering controller 40. Steering controller 40 may be automated to automatically steer vehicle 20 in accordance with a pre-defined or stored steering routine to cause a vehicle 20 to travel along a predefined or dynamically determined (based on the sensed environment of the vehicle) path.

Steering angle error monitoring system 22 comprises ground truth system 30, wheel odometry system 34, operator interface 36 and steering controller 40. Ground truth system 30 comprises one or more components configured to output signals indicating an actual positioning (speed, orientation, turning rate) of vehicle 20. Ground truth system 30 may comprise gyroscope 44, global positioning satellite (GPS)

system 46 and/or camera 48. Gyroscope 44 may be carried or supported by vehicle 20 and output signals indicating an actual turning rate (actual yaw) vehicle 20. GPS system 46 comprise a GPS antenna and receiver which output signals indicating the current position of vehicle 20. Changes in this position over time may be used to determine a ground speed of vehicle 20 and/or a turning rate/yaw rate of vehicle 20. Camera 48 may comprise one or more two-dimensional or stereo cameras configured to capture images (and output image signals) wherein the images/image signals may be analyzed over time (a visual or optical odometry) to determine an actual ground speed and/or actual turning rate/yaw rate of vehicle 20.

Wheel odometry system 34 comprises a system of one or more sensing components that output signals that may indicate an estimated speed of vehicle 20 and/or an estimated turning rate/yaw rate of vehicle 20 based upon a sensed rotation and/or angle of traction members 26. Odometry system 34 comprises speed sensor 50 and steering angle sensor 52. An estimated turning rate (the estimated yaw) may be determined based upon signals from speed sensor 50, signals from the steering angle sensor 52, and the wheelbase of vehicle 20 (the distance between the front and rear axles of traction members 26). For example, the estimated turning rate/yaw rate may be equal to the forward speed*tan (steering angle)/L, where forward speed is based upon signals from the speed sensor, steering angles based upon seat signals from the steering angle sensor, and L is the wheelbase. The mathematical phrase "tan" refers to the tangent of the angle variable. In some implementations, speed sensor 50 may comprise a wheel encoder, wherein the steering angle sensor 52 may comprise a potentiometer. In other implementations, speed sensor 50 and steering angle sensor 52 may comprise other types of sensors configured to output signals indicating speed and steering angle of vehicle 20 based upon the rotation and angle of traction members 26.

Operator interface 36 comprises one or more devices configured to communicate with an operator or manager of vehicle 20. Operator interface 36 may reside on vehicle 20 when the operator also resides on the vehicle 20. In some implementations, operator interface 36 may be remote from vehicle 20 such as where the operator is remotely overseeing the operation of vehicle 20 some implementations, operator interface 36 may comprise a touchscreen or a display monitor to provide visible notifications. In some implementations operator interface 36 may comprise a speaker to provide auditory notifications. In some implementations, operator interface 36 may further facilitate the input of instructions or commands for the selection of a steering routine. For example, operator interface 36 may additionally comprise be in the form of a touchscreen, a touchpad, keyboard, a mouse, a microphone with associated speech recognition or the like. In some implementations, operator interface 36 may be omitted.

Steering controller 40 outputs control signals to control the steering/direction of travel of vehicle 20. Steering controller 40 comprises a processing unit 54 and a non-transitory computer-readable medium 56. Medium 56 contains instructions for directing processing unit 54 to carry out method 100 shown in FIG. 2 (or any of the other example methods disclosed herein). Such instructions may include a steering program or routine 58. Steering controller 40 may be local, supported by vehicle 20 or may be remote, wherein steering controller 40 communicate with vehicle 20 in a wireless fashion. Steer controller 40 may likewise output control signals controlling the speed of vehicle 20.

Steering controller 40 may output such control signals to steer vehicle 20 in an automated fashion along a path according to a steering routine 58. The steering routine 54 may be stored on vehicle 20 or at a remote location. The steering routine 58 comprises a program providing instructions for controller 40 to alter the angle of the steered ground traction members 26 to alter or control the path of vehicle 20. The program or instructions may be static in nature, defining a predetermined geographic path along predetermined geographic points or locations. The program or instructions may be dynamic in nature, defining a predetermined path which may vary based upon environmental factors or parameters that are sensed during the travel of vehicle 20. For example, the steering routine 54 may call for a particular predetermined geographical path, but wherein variations from the path are instructed in response to encountering obstructions. The program or instructions may prescribe a predetermined angular steering adjustment for a predetermined period of time in response to encountering a particular sensed obstruction, landform or the like.

Instructions contained in medium 56 direct processing unit 54 to carry out the example Steering angle error monitoring method 100 shown in FIG. 2. As indicated by block 104, steering controller 40 determines the actual turning rate/yaw rate based upon signals from at least ground truth system 30. As discussed above, the actual turning rate/yaw rate may be turned based upon signals from gyroscope 44, based upon signals from GPS system 46 and/are based upon signals from camera 48. Steering controller 40 may determine the actual steering rate for multiple data points or multiple instances in time during a predefined period of time or time window exceeding one minute. In some implementations, the time window may be five minutes. The time window may have a length chosen to reduce the effects of noise and transmission delays.

As indicated by block 108 in FIG. 2, the controller 40 determines the estimated turning rate/yaw rate of vehicle 20 from the odometry system 34. As discussed above, the estimated turning may be based upon signals from speed sensor 50 and steering angle sensor 52 as well as the wheelbase of vehicle 20. Steering controller 40 may determine the estimated steering rate for multiple data points or multiple instances in time during the predefined period of time or time window exceeding one minute. In some implementations, the time window may be five minutes. The time window may have a length chosen to reduce the effects of noise and transmission delays. The time window of data points for the actual turning rate/yaw rate need not be the same as the time window of data points for the estimated turning rate/yaw rate.

As indicated by block 112, steering controller determines a steering angle error (SAE) based upon the actual turning rate/yaw rate determined in block 104 and the estimated turning rate/yaw rate determined in block 108 over a period of time (time window) exceeding one minute. In some implementations, the steering angle error is determined such that the steering angle error has a value which serves as an offset such that the estimated steering angle from the wheel odometry system 34 (plus the offset) closely approximates the actual steering angle from ground truth system 30.

In some implementations, steering angle error is a value determined over a period of time exceeding one minute, for example, five minutes, wherein the multiple data points or readings (estimated and actual turning rates/yaw rates at particular points in time) during the period of time. In such implementations, the steering angle error is a value such that the average of the multiple data points or readings for the estimated vehicle rotation rate from the wheel odometry system, plus the offset, closely approximates the corresponding multiple data points readings for the actual vehicle rotation rate from the ground truth system. Said another way, in such implementations, the plot of the estimated vehicle turning or rotation rate from the wheel odometry system, with the applied steering angle error offset, most closely matches or corresponds to the plot of the actual or measured vehicle turning or rotation rate from the ground truth system.

Figure 3:
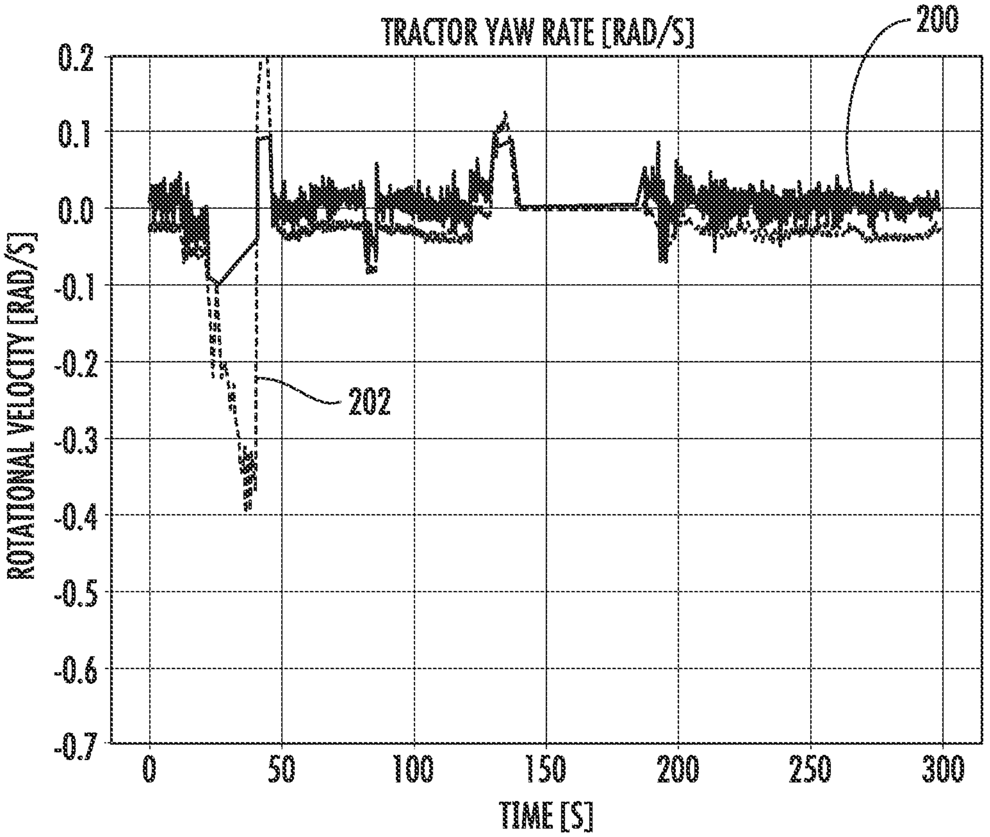
FIG. 3 is a graph illustrating an example plot of an example actual turning rate/yaw rate of a vehicle over a period of time and an example plot of an example estimated turning rate/yaw rate of the vehicle over the same period of time.
Figure 4:
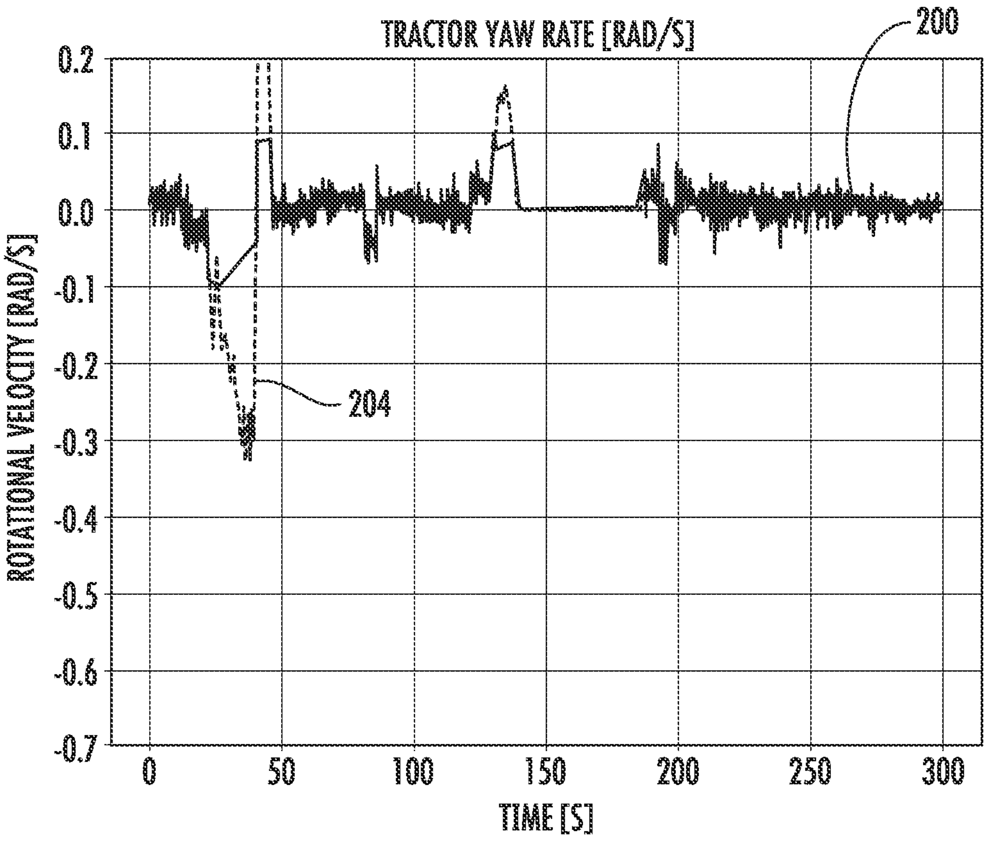
FIG. 4 is a graph illustrating the plots of FIG. 3 for the same period of time, but with the application of the determined steering angle error or offset correction.

FIG. 3 is a graph illustrating an example plot 200 of an example actual turning rate/yaw rate of vehicle 20 over a period of time (300 seconds) based upon signals from ground truth system 30 and an example plot 202 of an example estimated turning rate/yaw rate of vehicle 20 over the same period of time based upon signals from odometry system 34. FIG. 4 is a graph illustrating the same example plot 200 for the same period of time and an example plot 204 of the example estimated turning rate/yaw rate of vehicle 20 over the same period of time based upon signals from odometry system 34, but with the application of the determined steering angle error or offset correction. As shown by FIG. 4, the application of the steering angle error correction offset results in the overall plot of the estimated vehicle turning rate/yaw rate from odometry system 34 more closely matching or approximating the actual steering rate depicted by plot 200. Steering controller 40 may determine the value for the steering angle error that results in plot 202 in FIG. 3 being adjusted are moved to match plot 200 more closely, resulting in the modified plot 204.

In some implementations, the steering angle error is determined by the steering controller using a Gaussian optimization. The Gaussian optimization may be used to determine the steering angle error using the following formula:

estimated turning rate/yaw rate equals forward speed*tan(steering angle+Error)/*L*, where.

forward speed is based upon signals from the speed sensor, steering angles based upon seat signals from the steering angle sensor, L is the wheelbase, and Error is the steering angle error.

As indicated by blocks 160 and 162 in FIG. 2, steering controller 40 may output control signals causing various actions in response to and based upon the steering angle error determined in block 112. As indicated in block 160, steering controller 140 may adjust steering routine 58 based upon the determined steering angle error. For example, after determining the steering angle error or correction offset that results in plot 202 in FIG. 3 becoming plot 204 and FIG. 4, more closely approximating the plot 200 of the actual turning rate/yaw rate, based upon the actual and estimated turning rates (yaw rates) that occurred during the prior 300 seconds of time (the time window), steering controller 40 may adjust any steering instructions contained in the steering routine 58 for the next time window, the next 300 second period of time.

If the instructions or the steering routine 58 calls for a turn of X radians during the next time window, steering controller 40 may alter the steering routine such that it instead calls for a turn of X radians plus the steering angle error (which may be a positive or negative value). During this next window of time, steering controller 40 may continue to collect actual and estimated turning rate/yaw rate values from systems 30 and 34 and may use such values collected during this next or second time window to determine a second steering angle error for use in adjusting steering routine 58 for yet a third forthcoming time window. In some time Windows, the steering angle error or correction offset being applied may be nil or zero.

As indicated by block 162 in FIG. 2, steering controller 40 may output a notification based upon the steering angle error determined in block 112. For example, in response to the determined steering angle error exceeding a predetermined steering angle error threshold, the steering controller 40 may output control signals causing the display of a notification on operator interface 36 and/are audible alert or other notification communication to an operator or manager of the vehicle via operator interface 36. Such a notification may indicate a hardware failure or concern for the vehicle 20. Such a notification may be transmitted in a wired or wireless fashion to a manager or operator of the vehicle 20. In some implementations, the steering controller 40 may output the notification in response to the Delta (the difference between the current determined steering angle error and a prior determined steering angle error) exceeding a predefined Delta threshold.

As indicated by block 166 and arrow 167, steering controller 40 continually or periodically collects actual and estimated turning rates/yaw rates based upon signals from systems 30 and 34, continually or periodically determines the steering angle error for the particular window of time, and continually or periodically adjusts steering routine 58 based upon the determined steering angle error for the prior window of time or an average or other value based upon a past group or set of determined steering angle errors for multiple windows of time. As discussed above with respect to block 162, steering controller 40 may continually or periodically use the determined steering angles to output notifications.

In some implementations, the periods of time or time windows for which the estimated and actual turning rate/yaw rate values are used to determine steering angle errors are consecutive. In some implementations, the periods of time or time windows for which the estimated and actual turning rate/yaw rate values are used to determine steering angle errors are spaced apart in time. For example, the time windows may be spaced by an intervening period of time during which a steering angle error is not determined. Collection of the estimated and actual turning rates and the determination of a steering angle error may be initiated or triggered in response to operator input via operator interface 36 or in automatically response to a sensed environmental conditioner parameter. In some implementations, steering controller 40 may compare the actual geographic location of vehicle 20 relative to the expected geographic location of vehicle 22 according to steering routine 28. In response to a discrepancy that exceeds a predetermined threshold, steering controller 40 may automatically collect or determine the actual and estimated turning rates based upon signals from systems 30 and 34 and may automatically determine a steering angle error.

In some implementations, the collection of actual and estimated turning rates based upon signals from systems 30 and 34 in blocks 104 and 108, the determination of a steering angle error in block 112, and steering routine adjustment and/are the notification output in blocks 160 and 162 may be temporarily paused where such determinations may be susceptible to error or where such steering adjustments may pose a risk. For example the automatic periodic adjustment may be temporarily paused in response to the wheel slip difference of the vehicle exceeding a predetermined wheel slip difference threshold. The automatic periodic adjustment may be temporally paused in response to the actual turning rate/yaw rate of the vehicle exceeding a predetermined turning rate/yaw rate threshold. The automatic periodic adjustment may be temporarily paused in response to the actual speed of the vehicle being sufficiently slow so as experienced reduced accuracy. For example, the automatic periodic adjustment may be temporarily paused in response to the actual speed of the vehicle being less than or equal to 1 m/s or, in some cases, less than or equal to 5 m/s. The automatic periodic adjustment may be temporally paused in response to or based upon a difference between the current determined steering angle error and a prior determined steering angle error exceeding a predetermined Delta threshold.

Figure 5:
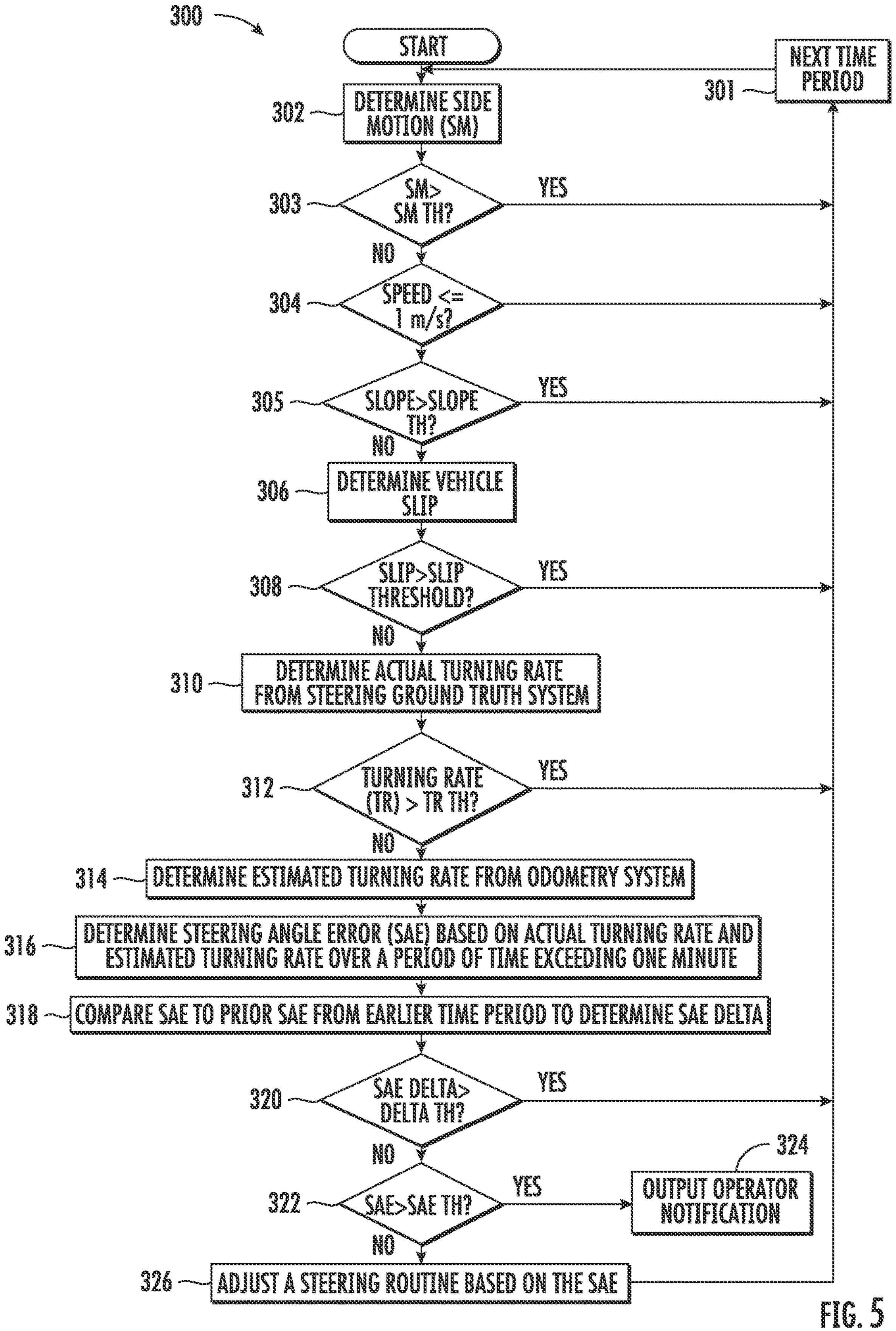
FIG. 5 is a flow diagram of an example vehicle steering angle error monitoring method.

FIG. 5 is a flow diagram of an example steering angle error monitoring method 300 that may be carried out by processor 54 of controller 40 based upon instructions provided in memory 56. As indicated by block 302, steering controller 40 determines the amount or rate of side motion of vehicle 20. This determination may be based upon signals from GPS 46 and/or visual odometer three from camera 48. As indicated by block 303, in response to a side motion of the vehicle exceeding a predetermined side motion threshold, steering controller 40 may pause method 300 are positive collection a determination of actual and estimated turning rates, the determination of a steering angle error and/or adjustment of steering routine 58 and/or the output of a notification. The pause results in method 300 starting over. In response to the side motion being less than the predetermined side motion threshold, method 300 proceeds to decision block 304.

As indicated by decision block 304, steering controller 40 determines the speed of vehicle 20 and compares it with a speed threshold of 1 m/s. In some implementations, the speed threshold may be greater, such as 5 m/s or faster. Steering controller 40 may obtain the actual ground speed based upon signals from GPS system 46 and/or camera 48. Steering controller 40 may obtain an estimated ground speed based upon signals from speed sensor 50. In response to the actual or estimated speed of being less than or equal to the speed threshold of 1 m/s, steering controller 40 may pause method 300 or pause the collection or determination of actual and estimated turning rates, the determination of a steering angle error and/or adjustment of steering routine 58 and/or the output of a notification. The pause results in method 300 starting over window of time or period of time 301. In response to the actual or estimated speed of vehicle 300 being greater than 1 m/s, method 300 proceeds to decision block 305.

As indicated by decision block 305, steering controller 40 may temporarily pause the collection or determination of actual and estimated turning rates, the determination of a steering angle error and/or adjustment of steering routine 58 and/or the output of a notification in response to a slope of the terrain and sets are pitch/roll of vehicle 20 exceeding a predetermined slope threshold. Steering controller 40 may obtain the current pitch/roll of vehicle 20 and such or the slope of the terrain based upon signals from camera 48 or gyroscope 44. In response to the current slope/pitch/roll not exceeding the predetermined slope threshold, method 300 proceeds to block 306.

As indicated by block 306, steering controller 40 determines the current wheel slip difference being experienced by vehicle 20. Controller 40 may determine the current wheel slip difference by comparing the actual ground speed based upon signals from camera 48 or GPS system 46 and the estimated ground speed based upon signals from speed sensor 50. As indicated by block 308, in response to the current wheel slip difference of vehicle 20 exceeding a predefined wheel slip difference threshold, steering controller 40 may temporarily pause the collection or determination of actual and estimated turning rates, the determination of a steering angle error and/or adjustment of steering routine 58 and/or the output of a notification. In response to the current wheel slip difference not exceeding the predefined wheel slip difference threshold, method 300 proceeds to block 310.

As indicated by block 310, steering controller 40 determines the actual turning rate/yaw rate from the ground truth system 30. Steering controller 40 determines the actual turning rate/yaw rate based on signals from gyroscope 44, GPS 46 and/are camera 48. As indicated by decision block 312, in response to the current turning rate/yaw rate of vehicle 20 exceeding a predefined turning rate/yaw rate (TR) threshold, steering controller 40 may temporarily pause the collection or determination of actual and estimated turning rates, the determination of a steering angle error and/or adjustment of steering routine 58 and/or the output of a notification. In response to the current turning rate/yaw rate not exceeding the predefined turning rate/yaw rate threshold, method 300 proceeds to block 314.

As indicated by block 314, steering controller 40 determines the estimated turning rate/yaw rate based upon signals from odometry system 34. As discussed above with respect to block 108 in FIG. 2, the estimated turning rate/yaw rate may be based upon signals from speed sensor 50 and signals from steering angle sensor 52 as well as the predetermined wheelbase of vehicle 20.

As indicated by block 316, steering controller 40 determines a steering angle error based upon the actual turning rate/yaw rate determined in block 310 and the estimated turning rate/yaw rate determined in block 314. As discussed above with respect to block 112 in FIG. 2, the steering angle error may be determined by steering controller 40 using actual and estimated turning rates and multiple instances of time during a period of time or time window exceeding one minute. As discussed above with respect to FIGS. 3 and 4, the steering angle error may have a value such that the plot of estimated turning rates within the time window and with the applied steering angle error or offset value closely approximates the plot of the actual turning rates during the window of time. As discussed above, the steering angle error may be determined by steering controller 40 using a Gaussian optimization. The Gaussian optimization may be used to determine the steering angle error using the following formula:

estimated turning rate (yaw rate) equals forward speed*tan(steering angle+Error)/$L$, where.

forward speed is based upon signals from the speed sensor, steering angles based upon seat signals from the steering angle sensor, L is the wheelbase, and Error is the steering angle error.

As indicated by block 318, steering controller 40 may compare the current steering angle error determined in block 316 to a prior steering angle error from an earlier window of time or time. To determine a steering angle error Delta. In some implementations, rather than comparing the current steering angle error to a single prior steering angle error, steering controller 40 may compare the current steering angle error to an average or other statistical value based upon a plurality of prior determine steering angle errors.

As indicated by decision block 320, steering controller 40 may automatically temporarily pause the collection or determination of actual and estimated turning rates, the determination of a steering angle error and/or adjustment of steering routine 58 and/or the output of a notification in response to the steering angle Delta exceeding a predetermined Delta threshold. In response to the steering angle error Delta not exceeding the Delta threshold, method 300 proceeds to decision block 322.

As indicated in decision block 322, steering controller 40 compares the current steering angle error to a predetermined steering angle error threshold. The steering angle error threshold may have a value which when exceeded, may indicate a current hardware failure or other issue for vehicle 20. As indicated by block 324, in response to the steering angle error threshold being exceeded, steering controller 40 may output an operator notification using operator interface 36. The notification may inform the operator of the current hardware failure or the need to inspect or investigate particular components of vehicle 20. In response to the steering angle threshold not being exceeded, method 300 proceeds to block 326.

As indicated by block 326, steering controller 40 adjusts the steering routine 58 based upon the steering angle error. In one implementation, steering controller 40 adjusts steering routine 58 based upon the most recent steering angle error determined in block 316. For example, as discussed above with respect to block 160, after determining the steering angle error or correction offset that results in plot 202 in FIG. 3 becoming plot 204 and FIG. 4, more closely approximating the plot 200 of the actual turning rate, based upon the actual and estimated turning rates that occurred during the prior 300 seconds of time (the example time window), steering controller 40 may adjust any steering instructions contained in the steering routine 58 for the next time window, the next 300 second period of time. As should be appreciated, the time window or period of time exceeding one minute may have other values other than the 300 seconds (five minutes) set forth in the example.

If the instructions or the steering routine 58 calls for a turn of X radians during the next time window, steering controller 40 may alter the steering routine such that it instead calls for a turn of X radians plus the steering angle error (which may be a positive or negative value). During this next window of time, steering controller 40 may continue to collect actual and estimated turning rate/yaw rate values from systems 30 and 34 and may use such values collected during this next or second time window to determine a second steering angle error for use in making adjustments to steering routine 58 for yet a third forthcoming time window. In some time Windows, the steering angle error or correction offset being applied may be nil or zero. In some implementations, steering controller 40 adjusts steering routine 58 based upon an average or other amount based upon a combination of previously determined steering angle errors from a plurality of time windows.

Figure 6:
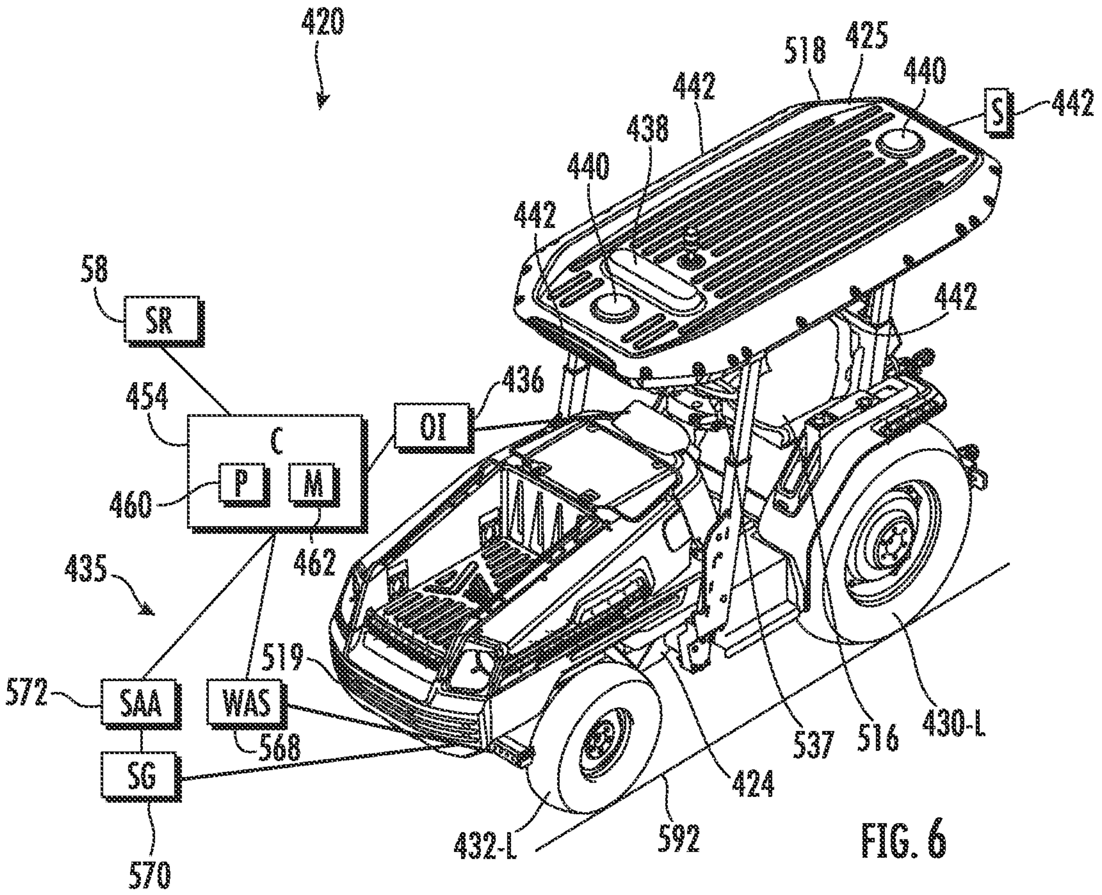
FIG. 6 is a perspective view of portions of an example vehicle comprising an example steering angle error monitoring system.
Figure 7:
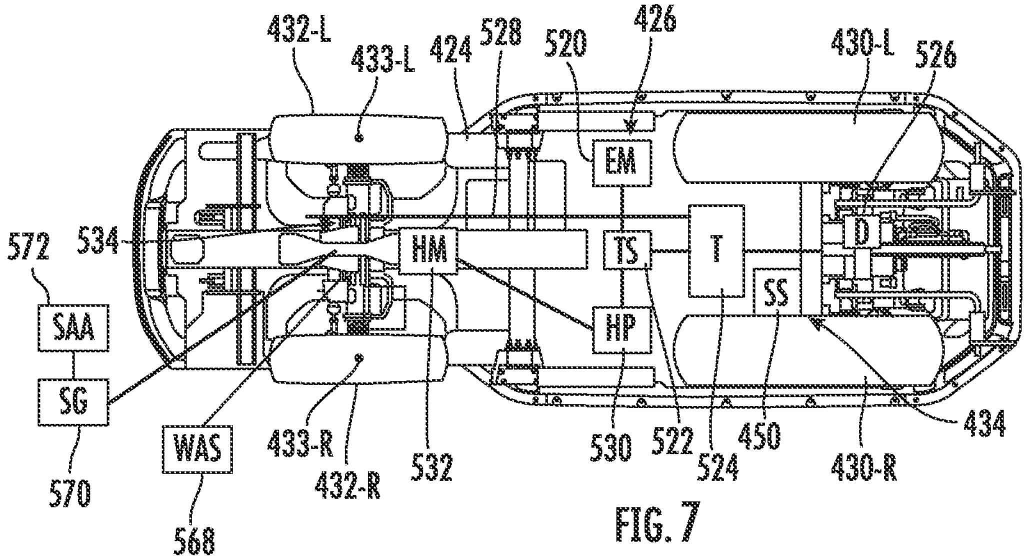
FIG. 7 is a bottom view of the example vehicle of FIG. 6.
Figure 8:
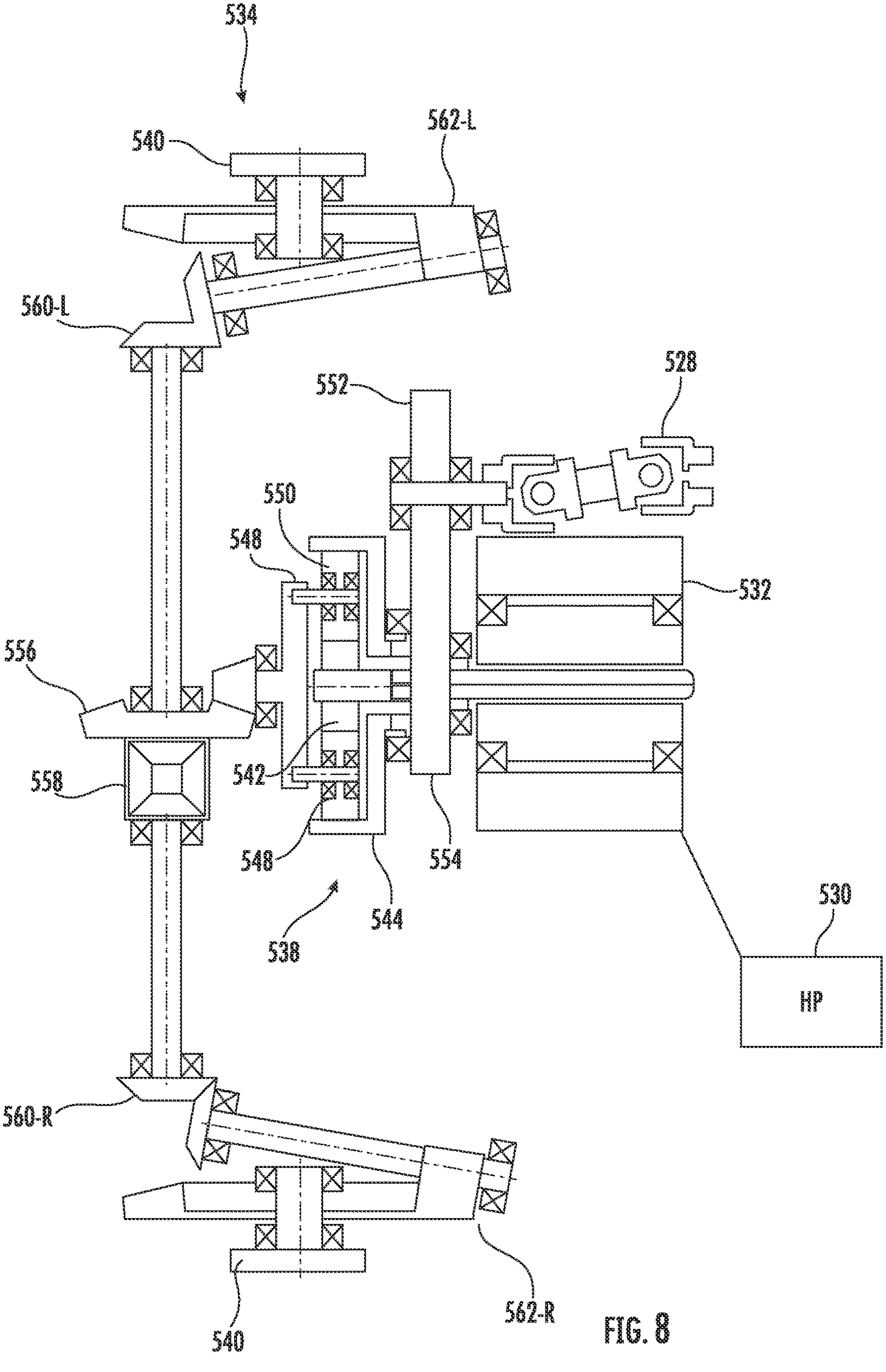
FIG. 8 is a diagram illustrating portions of an example propulsion system of the example vehicle of FIG. 6.

FIGS. 6, 7 and 8 illustrate portions of an example vehicle 420 having an example steering angle error monitoring system 422 for carrying out the example steering control method 100 (shown in FIG. 2) or the example method 300 (shown in FIG. 5). FIGS. 6-8 illustrate an example of how the steering angle error monitoring system of FIG. 1 may be more specifically implemented in a particular example of a vehicle in the form of a tractor.

As shown by FIG. 6, vehicle 420 is in the form of a tractor and comprises frame 424, operator cab 425, propulsion system 426, rear wheels 430-R, 430-L (collectively referred to as rear wheels 430), steered front wheels 432-R, 432-L (collectively referred to as front wheels 432), steer by wire system 435, operator interface 436, global positioning system (GPS) antenna 438, inertial measurement units 440, sensors 442-1, 442-2 and 442-4 (collectively referred to as sensors 442), speed sensor 450 and controller 454 (which may be part of steer by wire system 435). Steering angle error monitoring system 422 utilizes portions of vehicle 420, including controller 454.

Frame 424 comprises a structure which supports the remaining components of vehicle 420. Frame 424 supports operator cab 425. Operator cab 425 comprises that portion of vehicle 420 in which an operator of vehicle 420 resides during use of vehicle 420. In the example illustrated, operator cab 425 comprises seat 516 and roof 518. Seat is beneath roof 518. Roof 518 supports GPS antenna 438 and sensors 442.

Propulsion system 426 serves to propel vehicle 420 in forward and reverse directions without turning or during turning. As shown by FIG. 7, propulsion system 426 comprises battery 519 (shown in FIG. 6), electric motor 520, torque splitter 522, transmission 524, rear differential 526, transaxle 528, hydraulic pump 530, hydraulic motor 532 and front wheel transmission 534. Battery 519 comprises one or more battery modules which store electrical energy. Battery 519 is supported within an internal battery receiving cavity provided by frame 424. Battery 519 powers the electric motor 520.

Electrical motor 520 (schematically illustrated) outputs torque which is transmitted by a gearing to torque splitter 522. Torque splitter 522 transmits torque to transmission 524 and to hydraulic pump 530. Transmission 524 provides a plurality of forward and reverse gears providing different rotational speeds and torques to the rear wheels 430. Differential 526 comprises a set of driveshafts that cause the rotational speed of one shaft to be the average of the speeds of the other shafts or a fixed multiple of that average.

Transaxle 528 extends from transmission 524 and transmits torque to front wheel transmission 534 for rotatably driving the front steered wheels 432. Hydraulic pump 530 is driven by the torque provided by electric motor 520. Hydraulic pump 530 supplies pressurized hydraulic fluid to drive hydraulic motor 532. Hydraulic motor 532 supplies torque to front wheel transmission 524. This additional torque facilitates the rotatable driving of front wheels 432 at speeds that proportionally differ than the rotation speeds at which rear wheels 430 are being driven by transmission 524.

Front wheel transmission 534 delivers torque from one or both of transaxle 528 and hydraulic motor 532 to front wheels 432. FIG. 8 illustrates portions of one example propulsion system 426 including hydraulic pump 530, hydraulic motor 532 and planetary gear assembly 538. Hydraulic motor pump 530 powers hydraulic motor 532. In the example illustrated, hydraulic pump 530 comprises a continuous input variable displacement hydraulic piston pump. Hydraulic motor 532 comprises a modulation hydraulic motor.

Planetary gear assembly 538 combines torque from transaxle 528 and from hydraulic motor 532 and outputs the combined torque to front wheels 432 (shown In FIGS. 6 and 7) which are connected to front wheel flanges 540. Planetary gear assembly 538 comprises a sun gear 542, ring gear 544, and planet carrier 548 supporting planet gears 550 which intermesh with sun gear 542 and ring gear 544.

Sun gear 542 serves as a first input for planetary gear assembly 538. Sun gear 542 is connected to and receives torque from output shaft of hydraulic motor 532. Ring gear

544 serves as a second input for planetary gear assembly 538. Ring gear 544 is connected to transaxle 528 by a set of gears 552, 554. In other implementations, ring gear 544 may be connected to transaxle 528 by other transmission mechanisms such as belt and pulley arrangement or a chain sprocket arrangement. Planet carrier 548 is connected to gear set 556 and serves as an output for planetary gear assembly 538.

Gear set 556 comprises a pair of bevel gears connected to differential 558. Differential 558 outputs torque to gear sets 560-L and 560-R which further transmit torque to gear sets 562-L and 562-R which are connected to left and right front wheel flanges 540.

FIGS. 6-8 illustrate one example of propulsion system 426. In other implementations, propulsion system 426 may have other forms or configurations. For example, in other implementations, propulsion system 426 may comprise other combinations of electric motors, hydraulic pumps and hydraulic in some implementations, vehicle propulsion system 426 may omit hydraulic systems. In some implementations, propulsion system 426 may omit electric motors, such as where vehicle propulsion system 426 relies upon an internal combustion engine for supplying torque directly to the transmissions or using hydraulic pumps and motors.

Rear wheels 430 extend at a rear portion of frame 424 of vehicle 420 and are not steerable while front wheels 432 extend at a front portion of the frame 424 and are steerable by steer by wire system 435.

Front wheels 432-R, 432-L are rotatably supported by frame 424 for rotation about pivot axes 433-R, 433-L, respectively. Front wheels 432 are steerable about axes 433-R, 433-L (collectively referred to as axes 433) in response to turning of steering wheel 537.

Steer by wire system 435 controls the steering of vehicle 420. Steer by wire system 435 comprises steering wheel 537, wheel angle sensor 568, steering gears 570, steering angle actuator 572 and controller 454. Steering wheel 537 comprises an input device by which an operator may turn and steer front wheels 432. In the example, steering wheel 537 is provided as part of vehicle 420, positioned within an operator cab 425, forward of seat 516. In other implementations, vehicle 420 may omit cab 425, seat 516 or steering wheel 537, wherein steering wheel 537 may be provided at a remote location. The angular position of steering wheel 537 corresponds to or may be mapped to an angular position of the steered front wheels 432.

Wheel angle sensor 568 comprise one or more sensors, such as potentiometers or the like, that sense the angular position or steering angle of front wheels 432. Steering gears 570 comprise gears or other mechanism by which front wheels 432 may be rotated about axes 433. For example, in some implementations, steering gears 570 may comprise a rack and pinion gear arrangement. Steering angle actuator 472 comprises an actuator configured to drive steering gears 570 so as to adjust the angular positioning of front wheels 432. In some implementations, steering angle actuator 572 comprises an electric motor or a hydraulic motor (powered by a hydraulic pump).

Wheel angle sensor 568 (steering angle sensor 568) and speed sensor 450 form wheel odometry system 434. Wheel odometry system 434 outputs signals that may indicate an estimated speed of vehicle 420 and an estimated angle of front wheels 432. As described hereafter, controller 454 may determine an estimated turning rate (the estimated yaw) based upon signals from speed sensor 450, signals from the steering angle sensor 568, and the wheelbase of vehicle 420 (the distance between the front and rear axles of wheels 430, 432). In some implementations, speed sensor 450 (schematically illustrated) may comprise a wheel encoder. In other implementations, speed sensor 450 may comprise other types of sensors configured to output signals indicating speed of wheels 430, 432. For example, based upon signals from GPS antenna 438, propulsion system 426 or other conventional speed and velocity determination sensors or electronics, controller 454 may determine the speed of the vehicle 420.

Controller 454 intervenes between steering wheel 537 and steering angle actuator 572, forming the steer by wire functionality. Controller 454 further senses the angular positioning of steering wheel 537 and uses such information to output control signals causing steering angle actuator 572 to correspondingly or otherwise appropriately drive steering gears 570 to turn steering wheels 432 in accordance with rotation or positioning of steering wheel 537. Wheel angle sensor 568 may provide closed-loop feedback to controller 454 regarding the turning of front wheels 432 in response to steering control signals output by controller 454. In other implementations, the steer by wire system may have other configurations.

Operator interface 436 (schematically illustrated) comprises one or more devices by which an operator residing in seat 516 or elsewhere may provide input and commands to vehicle 420. Operator interface 436 may be in the form of a touchscreen, a monitor and mouse, keyboard, a touch pad, a joystick, a stylus pen, a toggle switch, slide bar, a microphone with speech recognition or the like.

Global positioning system (GPS) antenna 438 comprises an antenna situated upon roof 518 and provided as part of a larger global positioning satellite system, global navigation system (GNS) or other satellite-based radio navigation system. Antenna 438 may include an associated GPS receiver. GPS antenna 438 may be used by controller 454 to determine the geographical coordinates of vehicle 420.

Inertial measurement units 440 comprises electronic devices that measure and report angular rate of movement, force and orientation of a body. Such inertial measurement units 440 may utilize a combination of accelerometers, gyroscopes and/or magnetometers. Inertial measurement units 440 may be used to calculate attitude. Signals from inertial measurement units 440 may be used by controller 454 to calculate or otherwise determine an orientation of vehicle 420, such as its yaw, pitch and/or roll.

Sensors 442-1, 442-2, 442-3, and 442-4 (collectively referred to as sensors 442) are supported by roof 518 and are configured to sense and output signals indicating the surroundings of vehicle 420. Examples of sensors 442 include, but are not limited to, two-dimensional cameras, 3D stereoscopic cameras, light detection and ranging (LIDAR) sensors, infrared sensors and the like. Sensors 442 may output signals that may be used by a processor to identify obstructions or objects near vehicle 420, to identify or evaluate the type, slope or characteristics of the underlying soil or terrain 592, or for other functions. Signals from sensors 442 are transmitted to controller 454.

Controller 454 comprises processor 460 and memory 462. Processor 460 comprises a processing unit configured to carry out or follow instructions provided in memory 462.

Memory 462 comprises a non-transitory computer-readable medium providing such instructions for processor 460. Memory 462 may include integrated circuitry or software providing such instructions. Memory 462 includes instructions for directing processor 460 to carry out control of propulsion system 426 and steer by wire system 435. In some implementations, controller 454 carries out automated or remote control of vehicle 420. In the example illustrated, memory 462 includes instructions that direct processor 460 to carry out method 300 shown in the flow diagram presented in FIG. 5.

As indicated by block 302 in FIG. 5, steering controller 454 determines the amount or rate of side motion of vehicle 420. This determination may be based upon signals from GPS 438 and/or visual odometry from sensors 442 in the form of cameras. As indicated by block 303, in response to a side motion of the vehicle 420 exceeding a predetermined side motion threshold, steering controller 454 may pause method 300 are pause a determination of actual and estimated turning rates, the determination of a steering angle error and/or adjustment of steering routine 58 and/or the output of a notification. The pause results in method 300 starting over. In response to the side motion being less than the predetermined side motion threshold, controller 454 proceeds to decision block 304.

As indicated by decision block 304, steering controller 454 determines the speed of vehicle 420 and compares it with a speed threshold of 1 m/s. In some implementations, the speed threshold may be greater, such as 5 m/s or faster. Steering controller 454 may obtain the actual ground speed based upon signals from GPS system 438 and/or sensors 442 in the form of cameras. Steering controller 454 may obtain an estimated ground speed based upon signals from speed sensor 450. In response to the actual or estimated speed of being less than or equal to the speed threshold of 1 m/s, steering controller 454 may pause method 300 or pause the collection or determination of actual and estimated turning rates, the determination of a steering angle error and/or adjustment of steering routine 58 and/or the output of a notification. The pause results in method 300 starting over with the next period of time 301. In response to the actual or estimated speed of vehicle 420 being greater than 1 m/s, controller 454 proceeds to decision block 305.

As indicated by decision block 305, steering controller 454 may temporarily pause the collection or determination of actual and estimated turning rates, the determination of a steering angle error and/or adjustment of steering routine 58 and/or the output of a notification in response to a slope of the terrain and/or pitch/roll of vehicle 420 exceeding a predetermined slope threshold. Steering controller 454 may obtain the current pitch/roll of vehicle 420 and/or the slope of the terrain based upon signals from inertial measurement units 440 or from sensors 442 in the form of cameras). In response to the current slope/pitch/roll not exceeding the predetermined slope threshold, controller 454 proceeds to block 306.

As indicated by block 306, steering controller 454 determines the current wheel slip difference being experienced by vehicle 420. Controller 454 may determine the current wheel slip difference by comparing the actual ground speed based upon signals from sensors 442 (in the form of cameras) or GPS antennae 438 and the estimated ground speed based upon signals from speed sensor 450. As indicated by block 308, in response to the current wheel slip difference of vehicle 420 exceeding a predefined wheel slip difference threshold, steering controller 454 may temporarily pause the collection or determination of actual and estimated turning rates, the determination of a steering angle error and/or adjustment of steering routine 58 and/or the output of a notification. In response to the current wheel slip difference not exceeding the predefined wheel slip difference threshold, controller 454 proceeds to block 310.

As indicated by block 310, steering controller 454 determines the actual turning rate/yaw rate from a ground truth system provided by GPS antennae 438, cameras provided by sensors 442 and/or gyroscopes provided by inertial measurement units 440. As indicated by decision block 312, in response to the current turning rate/yaw rate of vehicle 420 exceeding a predefined turning rate/yaw rate (TR) threshold, steering controller 454 may temporarily pause the collection or determination of actual and estimated turning rates, the determination of a steering angle error and/or adjustment of steering routine 58 and/or the output of a notification. In response to the current turning rate/yaw rate not exceeding the predefined turning rate/yaw rate threshold, controller 454 proceeds to block 314.

As indicated by block 314, steering controller 454 determines the estimated turning rate/yaw rate based upon signals from odometry system 434. As discussed above, the estimated turning rate/yaw rate may be based upon signals from speed sensor 450 and signals from steering angle sensor 568 as well as the predetermined wheelbase of vehicle 20.

As indicated by block 316, steering controller 454 determines a steering angle error based upon the actual turning rate/yaw rate determined in block 310 and the estimated turning rate/yaw rate determined in block 314. As discussed above, the steering angle error may be determined by steering controller 454 using actual and estimated turning rates and multiple instances of time during a period of time or time window exceeding one minute. As discussed above with respect to FIGS. 3 and 4, the steering angle error may have a value such that the plot of estimated turning rates within the time window and with the applied steering angle error or offset value closely approximates the plot of the actual turning rates during the window of time. As discussed above, the steering angle error may be determined by steering controller 454 using a Gaussian optimization. The Gaussian optimization may be used to determine the steering angle error using the following formula:

estimated turning rate (yaw rate) equals forward speed*tan(steering angle+Error)/*L*, where.

forward speed is based upon signals from the speed sensor, steering angles based upon seat signals from the steering angle sensor, L is the wheelbase, and Error is the steering angle error.

As indicated by block 318, steering controller 454 may compare the current steering angle error determined in block 316 to a prior steering angle error from an earlier window of time or time. To determine a steering angle error Delta. In some implementations, rather than comparing the current steering angle error to a single prior steering angle error, steering controller 454 may compare the current steering angle error to an average or other statistical value based upon a plurality of prior determine steering angle errors.

As indicated by decision block 320, steering controller 454 may automatically temporarily pause the collection or determination of actual and estimated turning rates, the determination of a steering angle error and/or adjustment of steering routine 58 and/or the output of a notification in response to the steering angle Delta exceeding a predetermined Delta threshold. In response to the steering angle error Delta not exceeding the Delta threshold, controller 454 proceeds to decision block 322.

As indicated in decision block 322, steering controller 454 compares the current steering angle error to a predetermined steering angle error threshold. The steering angle error threshold may have a value which when exceeded, may indicate a current hardware failure or other issue for vehicle 420. As indicated by block 324, in response to the steering angle error threshold being exceeded, steering controller 454 may output an operator notification using operator interface 436. The notification may inform the operator of the current hardware failure or the need to inspect or investigate particular components of vehicle 20. In response to the steering angle threshold not being exceeded, method 300 proceeds to block 326.

As indicated by block 326, steering controller 454 adjusts the steering routine 58 based upon the steering angle error. In one implementation, steering controller 454 adjusts steering routine 58 based upon the most recent steering angle error determined in block 316. For example, as discussed above with respect to block 160, after determining the steering angle error or correction offset that results in plot 202 in FIG. 3 becoming plot 204 and FIG. 4, more closely approximating the plot 200 of the actual turning rate, based upon the actual and estimated turning rates that occurred during the prior 300 seconds of time (the example time window), steering controller 454 may adjust any steering instructions contained in the steering routine 58 for the next time window, the next 300 second period of time. As should be appreciated, the time window or period of time exceeding one minute may have other values other than the 300 seconds (five minutes) set forth in the example.

If the instructions or the steering routine 58 calls for a turn of X radians during the next time window, steering controller 454 may alter the steering routine such that it instead calls for a turn of X radians plus the steering angle error (which may be a positive or negative value). During this next window of time, steering controller 454 may continue to collect actual and estimated turning rate/yaw rate values from systems 30 and 34 and may use such values collected during this next or second time window to determine a second steering angle error for use in making adjustments to steering routine 58 for yet a third forthcoming time window. In some time Windows, the steering angle error or correction offset being applied may be nil or zero. In some implementations, steering controller 454 adjusts steering routine 58 based upon an average or other amount based upon a combination of previously determined steering angle errors from a plurality of time windows.

Although the claims of the present disclosure are generally directed to determining a steering angle error based over a period of time and outputting a notification and/or adjusting a steering routine based on the steering angle error, the present disclosure is additionally directed to the features set forth in the following definitions.

Definition 1. A steering angle error monitoring system comprising:
- a steering ground truth system for a vehicle;
- an odometry system for the vehicle, the odometry system comprising:
  - a steering angle sensor; and
  - a speed sensor; and
- a steering controller configured to:
  - determine a first steering angle error based on a difference between a first estimated turning rate based on signals from the odometry system over a first period of time exceeding one minute and a first actual turning rate based on signals from the steering ground truth system over the first period of time;
  - output control signals adjusting a steering routine based on the first steering angle error;
  - determine a second steering angle error based on a difference between a second estimated turning rate based on signals from the odometry system over a second period of time exceeding one minute and a second actual turning rate based on signals from the steering ground truth system over the second period of time; and
  - output control signals adjusting the steering routine based on the second steering angle error.

Definition 2. The steering angle error monitoring system of Definition 1, wherein the steering ground truth system comprises at least one of a global positioning satellite (GPS) system, a camera, and a gyroscope.

Definition 3. The steering angle error monitoring system of Definition 2, wherein the first period of time is at least two minutes.

Definition 4. The steering angle error monitoring system of Definition 2, wherein the first period of time is at least five minutes.

Definition 5. The steering angle error monitoring system of Definition 1, wherein the steering controller is configured to determine the first steering angle error by determining a value for the steering angle error such that the first estimated turning rate most closely approximates the first actual turning rate over the first period of time, the first estimated turning rate being determined as follows:

First estimated turning rate equals forward speed*tan (steering angle+Error)/$L$, where.

- forward speed is based upon signals from the speed sensor,
- steering angles based upon seat signals from the steering angle sensor,
- L is the wheelbase, and
- Error is the first steering angle error.

Definition 6. The steering angle error monitoring system of Definition 5, wherein the first steering angle error has a value such that an average of a plurality of estimated turning rate data points most closely matches an average of actual turning rate data points during the first period of time.

Definition 7. The steering angle error monitoring system of any of Definitions 1-6, wherein the steering controller is configured to determine the first steering angle error based on a Gaussian optimization function for the first period of time.

Definition 8. The steering angle error monitoring system of any of Definitions 1-7, wherein the steering controller is configured to pause determination of the first steering angle error or the output of the first control signals in response to signals from the speed sensor indicating a speed of less than or equal to 1 m/s.

Definition 9. The steering angle error monitoring system of any of Definitions 1-8, wherein the steering controller is configured to pause determination of the first steering angle or the output of the first control signals in response to signals from the speed sensor indicating a speed of less than or equal to 5 m/s.

Definition 10. The steering angle error monitoring system of any of Definitions 1-9, wherein the steering controller is configured to pause determination of the first steering angle error or the output of the first control signals in response to the actual turning rate exceeding two degrees per second.

Definition 11. The steering angle error monitoring system of any of Definitions 1-10, wherein the steering controller is configured to determine a wheel slip difference by comparing a first speed of the vehicle based upon signals from the speed sensor and a second speed of the vehicle based upon signals from a GPS system or a camera and is further configured to pause determination of the first steering angle error or the output of the first control signals in response to a wheel slip difference of 100% or greater.

Definition 12. The steering angle error monitoring system of any of Definitions 1-11, wherein the steering controller is configured to determine pause determination of the first steering angle error or the output of the first control signals in response to a slope of terrain traversed by the vehicle.

Definition 13. The steering angle error monitoring system of any of Definitions 1-12, wherein the steering controller is configured to pause the output of the second control signals based on a comparison of the steering angle error for the second period of time with the first steering angle error determined for the first period of time.

Definition 14. The steering angle error monitoring system of any of Definitions 8-13, wherein the steering controller is configured to continuously determine a particular steering angle error and output the control signals at all times other than the pausing.

Definition 15. The steering angle error monitoring system of any of Definitions 1-14, wherein the steering controller is configured to output a notification in response to a difference of at least 10% between the first estimated turning rate and the first actual turning rate.

Definition 16. The steering angle error monitoring system of any of Definitions 1-14, wherein the steering angle sensor comprises a potentiometer and wherein the speed sensor comprises a wheel encoder.

Definition 17. The steering angle error monitoring system of any of Definitions 1-16, wherein the steering controller is configured to periodically determine a steering angle error and to periodically output control signals as the steering angle error monitoring system travels during a life of the vehicle.

Definition 18. The steering angle error monitoring system of Definition 17, wherein the steering controller is configured to automatically determine a steering angle error and to automatically periodically output control signals based on the steering angle in response to a turning of the vehicle.

Definition 19. A steering angle error monitoring system comprising:
- a vehicle;
- a steering ground truth system;
- an odometry system comprising:
  - a steering angle sensor; and
  - a speed sensor; and
- a steering controller configured to:
  - determine a steering angle error based on a difference between an estimated turning rate based on signals from the odometry system over a period of time and an actual turning rate based on signals from the steering ground truth system over the period of time; and
  - output control signals to output a notification based on the steering angle error.

Definition 20. The steering angle error monitoring system of Definition 19, wherein the speed controller is configured to output the notification in response to the steering angle error comprising a difference of at least 10% between the estimated turning rate and the actual turning rate.

Although the present disclosure has been described with reference to example implementations, workers skilled in the art will recognize that changes may be made in form and detail without departing from the scope of the claimed subject matter. For example, although different example implementations may have been described as including features providing benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. A steering angle error monitoring system comprising:
- a steering ground truth system for a vehicle; and
- an odometry system for the vehicle, the odometry system comprising:
  - a steering angle sensor;
  - a speed sensor; and
  - a steering controller configured to:
    - determine a first steering angle error based on a difference between a first estimated turning rate based on first signals from the odometry system over a first period of time and a first actual turning rate based on first signals from the steering ground truth system over the first period of time;
    - determine a second steering angle error based on a difference between a second estimated turning rate based on second signals from the odometry system over a second period of time and a second actual turning rate based on second signals from the steering ground truth system over the second period of time;
    - determine a steering angle error based on the first steering angle error and the second steering angle error; and
    - output control signals to output a notification or adjust a steering routine based on the steering angle error.

2. A steering angle error monitoring system comprising:
- a steering ground truth system for a vehicle; and
- an odometry system for the vehicle, the odometry system comprising:
  - a steering angle sensor:
  - a speed sensor; and
  - a steering controller configured to:
    - determine a steering angle error based on a difference between an estimated turning rate based on signals from the odometry system over a period of time and an actual turning rate based on signals from the steering ground truth system over the period of time;
    - output control signals to output a notification or adjust a steering routine based on the steering angle error;
- where the steering controller is configured to:

determine a first steering angle error based on a difference between the estimated turning rate based on first signals from the odometry system over a first period of time exceeding one minute and the actual turning rate based on signals from the steering ground truth system over the first period of time;

output first control signals adjusting the steering routine based on the steering angle error;

determine a second steering angle error based on a difference between a second estimated turning rate based on second signals from the odometry system over a second period of time exceeding one minute and a second actual turning rate based on signals from the steering ground truth system over the second period of time; and output second control signals adjusting the steering routine based on the second steering angle error.

3. The steering angle error monitoring system of claim 2, wherein the first period of time is at least two minutes.

4. The steering angle error monitoring system of claim 2, wherein the steering controller is configured to pause the output of the second control signals based on a comparison of the steering angle error for the second period of time with the steering angle error determined for the first period of time.

5. The steering angle error monitoring system of claim 1, wherein the steering controller is configured to determine the first steering angle error by determining a value for the first steering angle error such that the first estimated turning rate most closely approximates the first actual turning rate, the first estimated turning rate being determined as follows:

estimated turning rate equals forward speed* tan (steering angle+Error)/L, where:

forward speed is based upon signals from the speed sensor, steering angle is based upon seat signals from the steering angle sensor, L is a wheelbase, and Error is the first steering angle error.

6. The steering angle error monitoring system of claim 5, wherein the first steering angle error has a value such that an average of a plurality of estimated turning rate data points most closely matches an average of actual turning rate data points over a period of time.

7. The steering angle error monitoring system of claim 1, wherein the steering controller is configured to determine the first steering angle error based on a Gaussian optimization function for a period of time.

8. The steering angle error monitoring system of claim 1, wherein the steering controller is configured to pause determination of the first steering angle error or the output of the control signals in response to signals from the speed sensor indicating a speed of less than or equal to 5 m/s.

9. The steering angle error monitoring system of claim 1, wherein the steering controller is configured to pause determination of the first steering angle error or the output of the control signals in response to signals from the speed sensor indicating a speed of less than or equal to 1 m/s.

10. The steering angle error monitoring system of claim 1, wherein the steering controller is configured to pause determination of the first steering angle error or the output of the control signals in response to the first actual turning rate exceeding two degrees per second.

11. The steering angle error monitoring system of claim 1, wherein the steering controller is configured to determine a wheel slip difference by comparing a first speed of the vehicle based upon signals from the speed sensor and a second speed of the vehicle based upon signals from a GPS system or a camera and is further configured to pause determination of the first steering angle error or the output of the control signals in response to a wheel slip difference of 100% or greater.

12. The steering angle error monitoring system of claim 1, wherein the steering controller is configured to pause determination of the first steering angle error or the output of the control signals in response to a slope of terrain being traversed by the vehicle.

13. The steering angle error monitoring system of claim 1, wherein the steering controller is configured to continuously determine a particular the steering angle error and output the control signals at all times other than during a pause.

14. The steering angle error monitoring system of claim 1, wherein the steering controller is configured to output a notification in response to a difference of at least 10% between the first estimated turning rate and the first actual turning rate.

15. The steering angle error monitoring system of claim 1, wherein the steering controller is configured to periodically determine the steering angle error and to periodically output the control signals as the vehicle travels during a life of the vehicle.

16. The steering angle error monitoring system of claim 1, wherein the steering controller is configured to automatically determine the steering angle error and to automatically periodically output the control signals based on the steering angle error in response to a turning of the vehicle.

17. A vehicle comprising:

a steering ground truth system; and an odometry system comprising:

a steering angle sensor;

a speed sensor; and a steering controller configured to:

determine a first steering angle error based on a difference between a first estimated turning rate based on first signals from the odometry system over a first period of time and a first actual turning rate based on first signals from the steering ground truth system over the first period of time;

determine a second steering angle error based on a difference between a second estimated turning rate based on second signals from the odometry system over a second period of time and a second actual turning rate based on second signals from the steering ground truth system over the second period of time;

determine a steering angle error based on the first steering angle error and the second steering angle error; and output control signals to output a notification based on the steering angle error.

18. The vehicle of claim 17, wherein the steering controller is configured to output the notification in response to the first steering angle error comprising a difference of at least 10% between the first estimated turning rate and the first actual turning rate.

19. The vehicle of claim 17, wherein the steering ground truth system comprises at least one of a global positioning satellite (GPS) system, a camera and a gyroscope.

20. The vehicle of claim 17, wherein the steering angle sensor comprises a potentiometer and wherein the speed sensor comprises a wheel encoder.

* * * * *